No. 691,469. Patented Jan. 21, 1902.
C. J. JEPPESEN.
LIQUID SEPARATOR.
(Application filed Apr. 18, 1901.)
(No Model.)
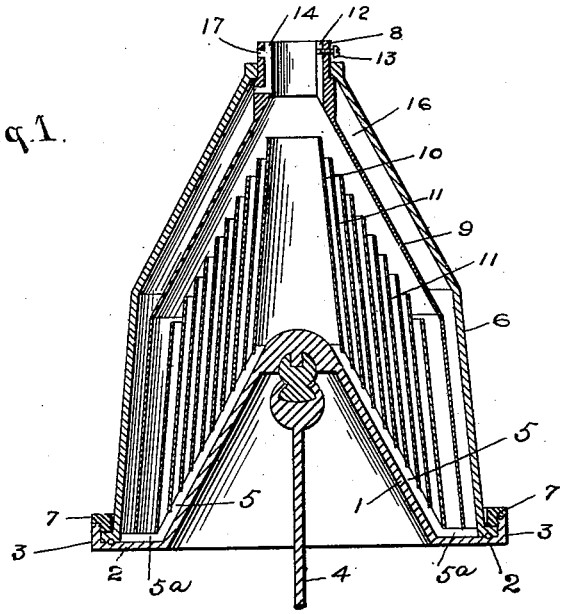
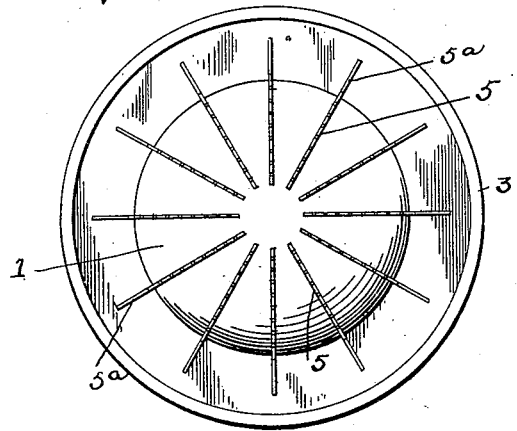
WITNESSES:
INVENTOR
Christen John Jeppesen
BY
ATTORNEY

UNITED STATES PATENT OFFICE.

CHRISTEN JOHN JEPPESEN, OF CENTERBURG, OHIO.

LIQUID-SEPARATOR.

SPECIFICATION forming part of Letters Patent No. 691,469, dated January 21, 1902.

Application filed April 18, 1901. Serial No. 56,350. (No model.)

*To all whom it may concern:*

Be it known that I, CHRISTEN JOHN JEPPESEN, a citizen of the United States, residing at Centerburg, in the county of Knox and State of Ohio, have invented a certain new and useful Improvement in Separators, of which the following is a specification.

My invention relates to the improvement of cream-separators; and the objects of my invention are to provide an improved separator of this class of superior construction and arrangement of parts, whereby a complete and rapid separation of milk and cream is attained, and to otherwise provide a machine of this class of superior construction. These objects I accomplish in the manner illustrated in the accompanying drawings, in which—

Figure 1 is a central vertical section of my improved separator. Fig. 2 is a plan view of the base, and Fig. 3 is an enlarged transverse section through the upper end portion or neck of the internal casing.

Similar numerals refer to similar parts throughout the several views.

In carrying out my invention I employ a rotary base comprising a central hollow conical portion 1, having a laterally-extending base-flange 2, the rim or outer portion of which is turned upward, as indicated at 3, to form a circular channel about the base of the cone. With the under side and central portion of the thickened and rounded apex of the cone is connected in any suitable manner—such, for instance, as that shown in my former patent, No. 456,654, of July 28, 1891—a vertical operating-shaft 4. The inclined outer surface of the cone is provided at desirable intervals with ribs or beads 5, which at the base of the cone are provided with outwardly-extending horizontal continuations 5ª, which are secured to or bear upon the upper side of the base-flange 2.

Resting on the base-flange 2 in the outer portion thereof and having its outturned lower end abutting against the upturned wall 3 is an external case 6, the latter extending upward, as shown, to a desirable height and thence tapering to form a substantially conical upper portion. In order to insure the external casing 6 in its connection with the base-flange 2, the inner surface of the flange-wall 3 is threaded and adapted to have screwed therein an externally-threaded angular locking 7. The upper and smaller end of the casing 6 closely surrounds the vertical and cylindrical upper end or neck portion 8 of an internal casing 9, which, although of less circumference, conforms substantially to the contour of the outer casing 6, the lower end of said internal case bearing, as shown, upon the rib extensions 5ª.

About the apex of the cone 1 is seated and desirably secured the lower and slightly-larger end portion of a central tube or cylinder 10, the upper end of which terminates in the upper portion of the internal casing 9. The base of this slightly-flaring cylinder 10 bears, as shown, upon the inclined ribs 5 of the cone 1. Arranged about the central cylinder 10, one within the other, are the desired number of cylinders 11, these cylinders 11 being of equal length with the cylinder 10 and being formed slightly flaring toward their bases and so graduated in circumference as to result in the formation of annular spaces between the same.

In constructing the neck portion 8 of the inner casing 9 I provide the inner wall thereof on one side with a vertical creamway, which is indicated at 12, this creamway being adapted to be intersected or partially intersected by a regulating-screw 13, which passes through the wall of said neck 8. On the opposite side of the neck I form on the inner wall thereof a vertical milkway 14, the lower end of which is provided with an outturned port 15, which communicates with the upper portion of the chamber or space 16, which is between the external and internal casings. The milkway 14 is provided in its upper portion with a laterally-extending outlet or opening 17.

It is obvious that the ribs 5, on which the cylinders 10 and 11 bear, may be notched or otherwise made to receive and form seats for the lower ends of said cylinders.

In utilizing my machine the milk from which the cream is to be separated is fed to the machine through a pipe or by other suitable means into the central cylinder 10 and onto the apex of the cone. Through the rotation of the shaft 4, and consequent rotation of the separator, which is mounted thereon, as described, the centrifugal force imparted to the milk thus introduced into the cylinder 10 will result in carrying the same into the cylinders toward the circumference of the casings. It is obvious that at the same time this force will result in the milk which is thus fed from the central cylinder filling the spaces between the cylinders 11, the greater pressure being against the inner surfaces of said cylinders, where, as will be obvious, the heavier ingredients will be thrown or forced, and these heavier ingredients will, following the slightly-conical inner wall-surfaces of the cylinders, be gradually forced or carried to the bottoms of the latter. It is obvious that the milk or heavier body in its tendency to travel outward will seek the points which are the greater distances from the centers of the cylinders, and owing to the conical form of said cylinders it is obvious that the milk or heavier ingredient will travel to the bottom thereof, from which points it will escape to the next outer cylinder. It will be understood that the reverse of this operation will be true of the lighter body or cream, which will rise to the tops of the cylders through the centrifugal force and conical form of said cylinders. Owing to this tendency of the cream or lighter body to move upward and toward the center the cream will be prevented from entering the chamber 16 between the internal and external casings, and this chamber will thus be caused to receive only the milk which has been thoroughly separated from the cream.

Having now fully described my invention, what I claim, and desire to secure by Letters Patent, is—

1. In a separator, the combination with a base comprising a central conical portion 1, a laterally-extending flange 2, said cone being provided at intervals with projecting ribs, of outer and inner casings 6 and 9, the latter having a neck portion 8 and a plurality of slightly-flaring cylinders arranged one within the other upon the ribs of said cone, substantially as specified.

2. In a separator, the combination with a base comprising a central conical portion 1, and a laterally-extending flange 2, said cone being provided at intervals with projecting ribs, of outer and inner casings 6 and 9, the latter having a neck portion 8 provided with vertical milk and cream channels 12 and 14 in its inner wall, said channel 14 communicating with the space between the outer and inner casings 6 and 9 and a plurality of slightly-flaring cylinders arranged one within the other upon the ribs of said cone, substantially as specified.

3. In a separator, the combination with a base comprising a central ribbed conical portion 1, a laterally-extending flange 2 having an upturned and internally-threaded outer portion, of external and internal casings rising from said base-flange, the latter having an outlet-neck and the former having a flanged base, cylinders arranged one within the other upon said cone and an angular locking-ring 7 adapted to be screwed into connection with the upturned outer portion of said cone base-flange, substantially as specified.

CHRISTEN JOHN JEPPESEN.

In presence of—
C. C. SHEPHERD,
A. L. PHELPS.